(12) United States Patent
Li et al.

(10) Patent No.: US 12,416,335 B2
(45) Date of Patent: Sep. 16, 2025

(54) DOUBLE-ROW ONE-WAY BEARING

(71) Applicant: Aktiebolaget SKF, Gothenburg (SE)

(72) Inventors: Wei Li, Shanghai (CN); Jianying Yang, Kunshan (CN); He Zhu, Shanghai (CN)

(73) Assignee: Aktiebolaget SKF, Gothenburg (SE)

(*) Notice: Subject to any disclaimer, the term of this patent is extended or adjusted under 35 U.S.C. 154(b) by 92 days.

(21) Appl. No.: 18/462,755

(22) Filed: Sep. 7, 2023

(65) Prior Publication Data

US 2024/0084848 A1 Mar. 14, 2024

(30) Foreign Application Priority Data

Sep. 14, 2022 (CN) .......................... 202211114682.X

(51) Int. Cl.
| | |
|---|---|
| *F16D 41/07* | (2006.01) |
| *F16C 19/06* | (2006.01) |
| *F16C 33/41* | (2006.01) |
| *F16C 41/00* | (2006.01) |
| *F16D 41/06* | (2006.01) |

(52) U.S. Cl.
CPC .............. *F16D 41/07* (2013.01); *F16C 19/06* (2013.01); *F16C 33/414* (2013.01); *F16C 41/001* (2013.01); *F16D 41/06* (2013.01); *F16D 2041/0605* (2013.01)

(58) Field of Classification Search
CPC .. F16D 41/06; F16D 41/07; F16D 2041/0605; F16C 41/001; F16C 19/06; F16C 33/41–427; F16C 33/3806

USPC .......... 192/45.1, 41 A, 110 B; 384/523–536
See application file for complete search history.

(56) References Cited

U.S. PATENT DOCUMENTS

| | | | | |
|---|---|---|---|---|
| 4,373,620 | A | * 2/1983 | Zlotek ..................... | F16D 41/07 192/41 A |
| 5,404,642 | A | * 4/1995 | Alling ..................... | F16C 43/08 29/898.044 |
| 6,279,708 | B1 | * 8/2001 | Yatabe .................... | F16D 41/07 192/110 B |
| 6,464,397 | B2 | * 10/2002 | Kobayashi ............ | F16C 33/418 384/450 |
| 2006/0219494 | A1 | * 10/2006 | Moon ................... | F16C 41/001 188/82.1 |

* cited by examiner

*Primary Examiner* — Richard M Lorence
(74) *Attorney, Agent, or Firm* — Stinson LLP

(57) ABSTRACT

A double-row one-way bearing includes a bearing outer ring and a bearing inner ring coaxially arranged around a central axis. Spherical rollers are arranged between the bearing outer ring and the bearing inner ring. Wedges are radially arranged between the bearing outer ring and the bearing inner ring relative to the central axis, and spaced apart from the spherical rollers in the axial direction. Each wedge is provided with a groove at the side away from the bearing inner ring. A cage is coaxially arranged with the bearing outer ring and the bearing inner ring and provided with roller holding portions and wedge holding portions. The spherical rollers are respectively held in the roller holding portions and the wedges are respectively held in the wedge holding portions. An elastic limit ring passes through the groove of each wedge to apply a radially inward force to each wedge.

20 Claims, 6 Drawing Sheets

DOUBLE-ROW ONE-WAY BEARING

CROSS-REFERENCE TO RELATED APPLICATION

This application claims priority to Chinese Application No. 202211114682.X, filed Sep. 14, 2022, the entirety of which is hereby incorporated by reference.

FIELD

The present disclosure relates to a kind of double-row one-way bearing.

BACKGROUND

One-way bearing is a kind of bearing that can only rotate in one direction, and it is usually used in some occasions where the bearing is not allowed to run in the opposite direction (for example, it is suitable for some applications such as motors of pulsator washing machines, slings of container cranes in ports, bicycle wheels, agricultural machinery, and conveyor belts).

For example, as shown in FIGS. 13-15, a conventional one-way bearing includes an outer ring 1, an inner ring 4, spherical rollers 6, wedges 3, a cage 5 and wedge holding springs 2, and the cage 5 holds both the spherical rollers 6 and the wedges 3 for restricting the one-way rotation of the bearing. When the bearing runs in the reverse direction, the wedges 3 in the one-way bearing will block the bearing and prevent the bearing from running in the reverse direction.

However, such one-way bearing in the prior art involves a complicated structure, inconvenient installation and poor lubricating and sealing effects. Specifically, the cage of such bearing comprises pockets (not shown) for the spherical rollers 6 and pockets 7 for holding the wedges 3, and there must be wedge holding springs 2 near each wedge pocket 7 to abut against the wedges 3 in the circumferential direction, to make the wedges abut against the cage 5, so as to ensure their positions when there is no force applied. Therefore, grooves 8 for placing the wedge holding springs 2 need to be machined near each wedge pocket 7 of the cage 5. Because of this structure, not only the cage needs to be processed in a complicated way, but also the wedge retaining springs 2 need to be installed for each wedge 3, which makes the bearing installation process time-consuming and laborious.

Moreover, the installation process of the one-way bearing having the cage 5 and the wedges 3 is very complicated, and the following steps are generally followed during installation: the inner ring 4 and the outer ring 1 of the bearing are fixed first, the spherical rollers 6 are pressed into the raceway, then the cage 5 is inserted, then each wedge 3 is installed in the corresponding pocket, and then each wedge retaining spring 2 is installed. Therefore, in order to install the wedges 3 and the springs 2, the pockets for accommodating the wedges 3 must have axial openings, and after the wedges 3 and the springs 2 are installed, an annular cover (not shown) must be additionally installed on the cage 5 to close the pockets and prevent the wedges 3 from axially disengaging from the pockets. This kind of cover usually also has a certain sealing function. At the same time, since the cover must be added, such bearing in the prior art can only be lubricated by the lubricant inside, but cannot accept the lubricant from the outside of the bearing.

In this kind of one-way bearing, the spherical rollers 6 interfere with the wedges 3 during installation, and the number of the wedges 3 is usually the same as that of spherical rollers 6 (the wedges 3 are usually installed between pockets of spherical rollers 6 in the circumferential direction).

In addition, the cage 5 is usually a nylon cage. Moreover, due to the cage material and due to the need to install the wedge holding springs 6, the cage 5 must also have a considerable thickness (usually at least 60% of the diameter of the spherical rollers, and preferably 85-95% of the diameter of the spherical rollers), and occupies almost most of the inner space of the bearing between the outer ring and the inner ring, as shown in FIG. 15. This kind of quite thick cage is not only bad for bearing lubrication, but also limits the choice of the sealing type when sealing is required (since some kind of sealing requires large bearing internal space).

Moreover, because the wedge retaining springs 6 are used to stabilize the position of the wedges 3 when there is no force, there is still a certain circumferential space for the wedges 3 in their pockets. In this case, when the bearing is reversed, it will rotate in the reversing direction for 1-2 degrees until its reverse locking function is realized, that's, the one-way bearing in the prior art has a certain reverse locking delay. In some cases, it is difficult to meet the strict anti-reverse requirements.

In addition, this type of one-way bearing can only bear very small radial forces and can hardly bear axial forces. If necessary, the traditional wedge one-way bearing must be used as an anti-reverse part together with other bearings.

Therefore, it is desirable to provide a one-way bearing that can overcome the above shortcomings of the prior art.

SUMMARY

In view of the problems and demands mentioned above, this disclosure proposes a double-row one-way bearing, which solves the above problems and brings other technical effects by means of the following technical features.

On the one hand, the disclosure proposes a double-row one-way bearing comprising: a bearing outer ring and a bearing inner ring with raceways, which are coaxially arranged around the central axis of the double-row one-way bearing, wherein the bearing inner ring is located inside the bearing outer ring; a plurality of spherical rollers arranged between the bearing outer ring and the bearing inner ring along the raceway; a plurality of wedges radially arranged between the bearing outer ring and the bearing inner ring relative to the central axis, and spaced apart from the plurality of spherical rollers in the axial direction, and each wedge is provided with a groove at the side away from the bearing inner ring; a cage coaxially arranged with the bearing outer ring and the bearing inner ring and provided with a plurality of roller holding portions and a plurality of wedge holding portions, wherein the plurality of spherical rollers are respectively held in the plurality of roller holding portions and the plurality of wedges are respectively held in the plurality of wedge holding portions; an elastic limit ring coaxially arranged with the bearing outer ring and the bearing inner ring, and passes through the groove of each wedge to apply a radially inward force to each wedge.

The double-row one-way bearing according to the disclosure has many advantages over the prior art: the wedge positioning structure is simplified; the structure of the cage is simplified, a thickness thereof is reduced and the strength thereof is increased; there is no need to add additional sealing end covers (the bearing can be provided as an open bearing without sealing); the inversion angle (inversion space) required before realizing the locking is smaller; the number of the wedges is independent of the spherical rollers; the number of the wedges can be greater than the number of spherical rollers to increase the force when the bearing is stuck in reverse, and so on.

Hereinafter, the preferred embodiment for implementing the present disclosure will be described in more detail with reference to the accompanying drawings, so that the features and advantages of the present disclosure can be easily understood.

BRIEF DESCRIPTION OF THE DRAWINGS

In order to explain the technical scheme of the embodiment of the present disclosure more clearly, the attached drawings of the embodiment of the present disclosure will be briefly introduced below. The drawings are only used to show some embodiments of the present disclosure, and not all embodiments of the present disclosure are shown in the drawings.

Figure 1:
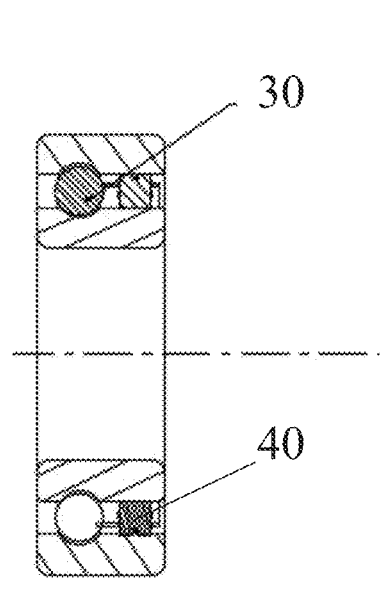
FIG. 1 is a sectional view taken along a longitudinal plane of an exemplary embodiment of a double-row one-way bearing proposed by the present disclosure.

LIST OF REFERENCE NUMERALS 10 bearing outer ring
11 first annular recess
20 bearing inner ring
21 second annular recess
30 spherical roller
40 wedge
41 groove
50 cage
51 roller holding portion
52 wedge holding portion
53 optimal arc
54 edge
55 openings
60 elastic limit ring

DETAILED DESCRIPTION

In order to make the purpose, technical features, and advantages of the technical scheme of the present disclosure clearer, the technical scheme of the embodiment of the present disclosure will be described clearly and completely with the accompanying drawings of specific embodiments of the present disclosure. Like reference numerals in the drawings represent like parts. It should be noted that the described embodiments are parts of the embodiments of the present disclosure, not all the embodiments. Based on the described embodiments of the present disclosure, all other embodiments obtained by those skilled people in the field without creative work belong to the scope of protection of the present disclosure.

Compared with the embodiments shown in the attached drawings, the feasible embodiments within the protection scope of this disclosure may have fewer components, further components not shown in the attached drawings, different components, components arranged differently or components connected differently, etc. Furthermore, two or more components in the drawings may be implemented in a single component, or a single component shown in the drawings may be implemented as a plurality of separate components.

Unless otherwise defined, technical terms or scientific terms used herein shall have their ordinary meanings as understood by people with ordinary skills in the field to which this disclosure belongs. The words "first", "second" and similar words used in the specification and claims of the patent application of this disclosure do not indicate any order, quantity, or importance, but are only used to distinguish different components. Similarly, similar words such as "a" or "an" do not necessarily mean quantitative restrictions. Similar words such as "including" or "comprising" mean that the elements or objects appearing before the word has the elements or objects listed after the word and their equivalents, without excluding other elements or objects. Similar words such as "connected to" or "connected with" are not limited to physical or mechanical connection, but can include electrical connection, whether direct or indirect. "up", "down", "left" and "right" are only used to indicate the relative positional relationship. When the absolute position of the described object changes, the relative positional relationship may also change accordingly.

The present disclosure relates to a double-row one-way bearing, which can only rotate in one direction, and can automatically lock and cannot rotate in the other direction. The double-row design of this disclosure includes a row of spherical rollers and a row of wedges, and integrates the advantages of ball bearings and ordinary wedge one-way bearings. At the same time, the disclosure also improves the retaining structure and retaining means of the wedge, and designs a special structure and arrangement different with the existing wedge one-way bearing, such that the double-row one-way bearing is compact, simple, and easy to assemble and produce, and can solve those problems in the prior art as mentioned above.

Other advantages of the double-row one-way bearing of the present disclosure will be described in detail in combination with specific structural features.

In generally, as shown in the attached drawings, the double-row one-way bearing proposed by this disclosure includes the following main components: a bearing outer ring 10 and a bearing inner ring 20 with raceways, a plurality of spherical rollers 30, a plurality of wedges 40, a cage 50 and an elastic limit ring 60.

Specifically, the bearing outer ring 10 and the bearing inner ring 20 are coaxially arranged around the central axis of the double-row one-way bearing, wherein the bearing inner ring 20 is located inside the bearing outer ring 10.

A plurality of spherical rollers 30 are arranged between the bearing outer ring 10 and the bearing inner ring 20 along the raceway.

A plurality of wedges 40 are radially arranged between the bearing outer ring 10 and the bearing inner ring 20 with respect to the central axis, and are spaced apart from the plurality of spherical rollers 30 in the axial direction, and each wedge is provided with a groove 41 at the side away from the bearing inner ring 20.

The cage 50 is coaxially arranged with the bearing outer ring 10 and the bearing inner ring 20, and is provided with a plurality of roller holding portions 51 and a plurality of wedge holding portions 52, wherein the plurality of spherical rollers 30 are respectively retained in the plurality of roller holding portions 51 and the plurality of wedges 40 are respectively retained in the plurality of wedge holding portions 52.

The elastic limit ring 60 is coaxially arranged with the bearing outer ring 10 and the bearing inner ring 20 and passes through the groove 41 of each wedge 40. The elastic limit ring 60 exerts a radially inward force on each wedge 40 by means of its radially inward contraction tendency, so that these wedges 40 are stably pressed against the inner ring 20. Moreover, by adjusting a diameter and material of the elastic limit ring 60, the radial force exerted on each wedge 40 can be adjusted.

Therefore, the important feature of the present disclosure is that, instead of a plurality of wedge holding springs which must be set respectively for all wedges as in the prior art, the present disclosure uses one elastic limit ring 60 to directly and stably hold all wedges in place, so as to reduce the influence of the cage design on the positioning and holding of the wedge of the present disclosure, thereby simplifying the cage design, reducing thickness, providing more space for sealing and lubrication, and allowing more sealing types. Moreover, by introducing the elastic limit ring to fix the wedges, the inversion angle (i.e., inversion space) before the wedge locking of the disclosure can be smaller than that of the wedge locking in the prior art; that is to say, when the bearing of the disclosure reverses, the inversion angle required by the wedge is smaller than that of the prior art.

In addition, the design of a row of linear rollers 30 and a row of wedges 40 in this disclosure is beneficial to the improvement of axial force bearing capacity: the side with the spherical rollers is designed with deep groove ball bearings, which can bear certain axial and radial forces like traditional deep groove ball bearings.

The specific structure of the double-row one-way bearing according to the present disclosure will be described in detail below.

The bearing outer ring 10 is an integral annular ring structure, and the annular outer surface of the bearing outer ring 10 constitutes the outer surface of the whole double-row one-way bearing. Similarly, the bearing inner ring 20 is an integral annular ring structure, which is coaxially arranged with the bearing outer ring 10. An outer diameter of the bearing inner ring 20 is smaller than an inner diameter of the bearing outer ring 10, so that the bearing inner ring 20 is arranged inside the bearing outer ring 10.

Figure 9:
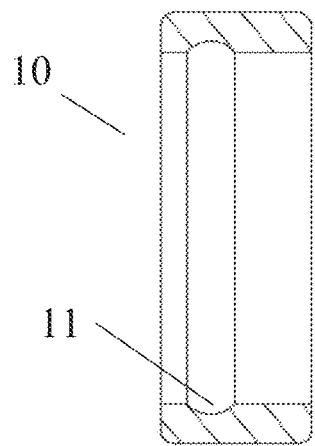
FIG. 9 is a view of an exemplary embodiment of a bearing outer ring that can be used in the double-row one-way bearing of the present disclosure.
Figure 10:
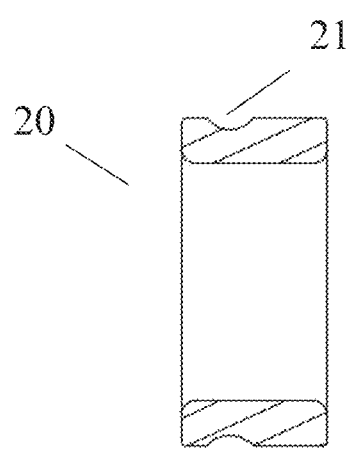
FIG. 10 is a view of an exemplary embodiment of a bearing inner ring that can be used in the double-row one-way bearing of the present disclosure.

FIGS. 9 and 10 are cross-sectional views of a bearing outer ring and a bearing inner ring, respectively, which can be used in the double-row one-way bearing of the present disclosure. It can also be seen from the figures that the bearing outer ring 10 can be provided with a first annular recess 11, and the bearing inner ring 20 is provided with a second annular recess 21 opposite to the first annular recess 11. When assembled, the first annular recess 11 and the second annular recess 2 form a raceway for the plurality of spherical rollers 30. However, the bearing inner ring 20 and the bearing outer ring 10 do not have such raceways at regions surrounding the wedges 40.

Referring to FIG. 1, the double-row one-way bearing has two rows of elements, namely, the spherical rollers 30 and the wedges 40, which are spaced apart in the axial direction, but both are located between the bearing inner ring 20 and the bearing outer ring 10.

Figure 2:
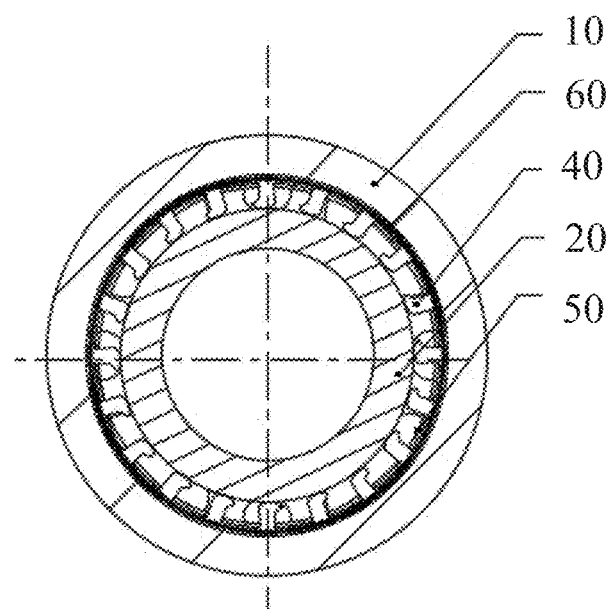
FIG. 2 is a sectional view of the double-row one-way bearing of FIG. 1 taken along a plane perpendicular to the central axis of the bearing.

The wedges 40 are used to provide a one-way rotation function. The shape of the wedges 40 can be seen from FIGS. 2 and 7. In the plane perpendicular to the central axis of the double-row one-way bearing, each wedge 40 defines two diagonal distances, that is, the distances between two opposite corners of the wedge, and one of the two diagonal distances is larger than the other, and the larger diagonal distance is larger than the gap between the bearing inner ring and the bearing outer ring, and the smaller diagonal distance is smaller than the gap between the bearing inner ring and the bearing outer ring. In this way, when the wedges rotate due to unexpected relative rotation between the bearing inner ring and the bearing outer ring, the two opposite corners with the larger diagonal distance are stuck between the surfaces of the bearing inner ring and the bearing outer ring respectively, so that the rotation of the bearing is locked, that is, the bearing is prevented from rotating in the desired direction by the force generated by means of the wedges. However, if the bearing inner ring and the bearing outer ring rotate in the desired direction, the rotation of the wedges makes the two opposite corners with the smaller diagonal distance closes to the surfaces of the bearing inner ring and the bearing outer ring respectively, and since the smaller diagonal distance is smaller than the gap between the bearing inner ring and the bearing outer ring, the locking with the bearing inner ring and the bearing outer ring will not occur, and the bearing can rotate normally in the desired direction.

Figure 3:
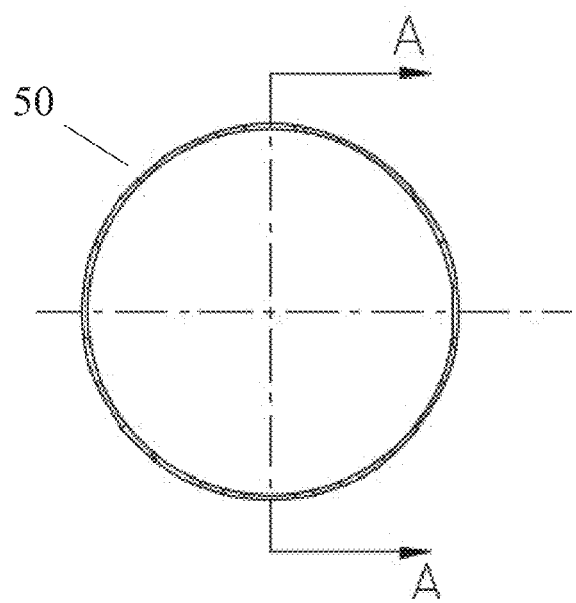
FIG. 3 is a view of an exemplary embodiment of a cage that can be used for a double-row one-way bearing of the present disclosure.
Figure 4:
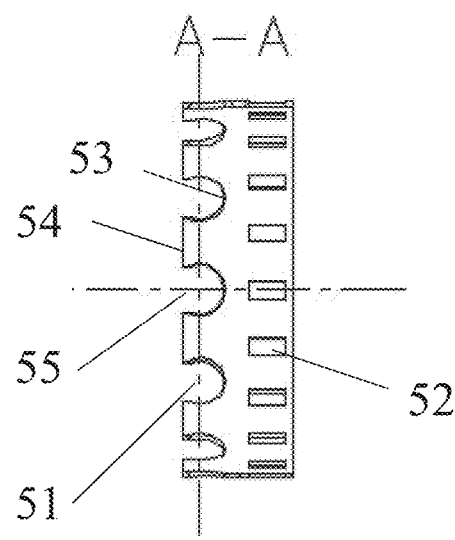
FIG. 4 is the cage of FIG. 3 viewed from another angle.

FIGS. 3 and 4 show the cage 50 of the present disclosure from different perspectives, respectively. The cage 50 is coaxially arranged with the bearing outer ring 10 and the bearing inner ring 20. Due to this special cage structure, it allows a number of the spherical rollers and number of the wedges to be independent with each other.

Specifically, the cage 50 is provided with a plurality of roller holding portions 51 and a plurality of wedge holding portions 52, wherein the plurality of spherical rollers 30 are respectively held in the plurality of roller holding portions 51 and the plurality of wedges 40 are respectively held in the plurality of wedge holding portions 52. Based on this structure, the number of spherical rollers is consistent with the number of the roller holding portions of the cage, and the number of the wedges is consistent with the number of the roller holding portions of the cage, but the number of spherical rollers may be different from the number of the wedges.

In contrast, in the double-row bearing with the cage pockets in the prior art, due to the stress requirement of preventing reverse rotation, the wedges must have sufficient thickness and quantity, and wedge holding portions can only be arranged at intervals between multiple roller holding portions because they must adapt to thickness of the wedges, so the number of the wedges must adapt to the number of spherical rollers, that is, the number of the wedges must be exactly the same with the number of spherical rollers. Compared with the conventional design, the present disclosure allows the number and the thickness of the wedges to be set independently of the spherical rollers.

Preferably, the cage 50 may be a sheet, and the sheet is annular around the central axis. For example, the thickness of the cage 50 in the radial direction is preferably 5-30% of the diameter of the spherical rollers 30. And more preferably, the thickness of the cage 50 in the radial direction is 5-15% of the diameter of the spherical rollers 30.

Preferably, the number of the wedges may be greater than the number of spherical rollers. In this case, compared with the prior art, the thickness of the wedge can also be thinner. For example, the thickness of the wedges 40 in the circumferential direction is 2%-4.5% of a circumference of circle formed by the inner diameter of the cage (50). In general, although the wedge is thinner, the force of the bearing generated during reverse locking can be further increased due to the increase of the number of the wedges, which brings greater flexibility and reliability for the application, design, and manufacture of the bearing.

Preferably, the cage 50 may be a pressed cage. For example, the cage 50 may be made of steel material by means of a stamping process. Compared with the current mainstream plastic cage, the steel material greatly improves the strength, especially the reverse torque capacity of the bearing, and solves the problems of insufficient strength and low reverse torque capacity of the traditional one-way bearings with plastic cages. In addition, due to the improvement of material strength, the number of the wedges can be increased. At the same time, the cage 50 made by stamping steel also has low production cost.

In addition, the roller holding portions 51 and the wedge holding portions 52 may be pockets through the sheet material. Therefore, the cage 50, and the roller holding portions 51 and the wedge holding portions 52 thereof can be formed by a simple machining process.

Therefore, compared with the prior art, the structure and processing of this cage 50 are simplified, the thickness is significantly reduced, and it will not take up a lot of internal space of the bearing, and at the same time, it can ensure sufficient strength, which provides greater freedom and reliability for the lubricating and sealing of the bearing.

Next, preferred embodiments of the roller holding portions 51 and the wedge holding portions 52 will be described in detail.

Preferably, referring particularly to FIG. 4, the roller holding portions 51 may be pockets with an axial opening and claws. Specifically, the roller holding portions 51 of the cage 50 are defined by an arc longer than a semicircle, that is, a superior arc 53, which ends at an edge 54 of the cage 50 away from the wedge holding portions 52, so that the roller holding portions forms openings 55 that are axially open. At the time of assembly, a plurality of spherical rollers can be installed into the roller holding portions in the axial direction through the opening 55, to improve the convenience of assembly.

Figure 12:
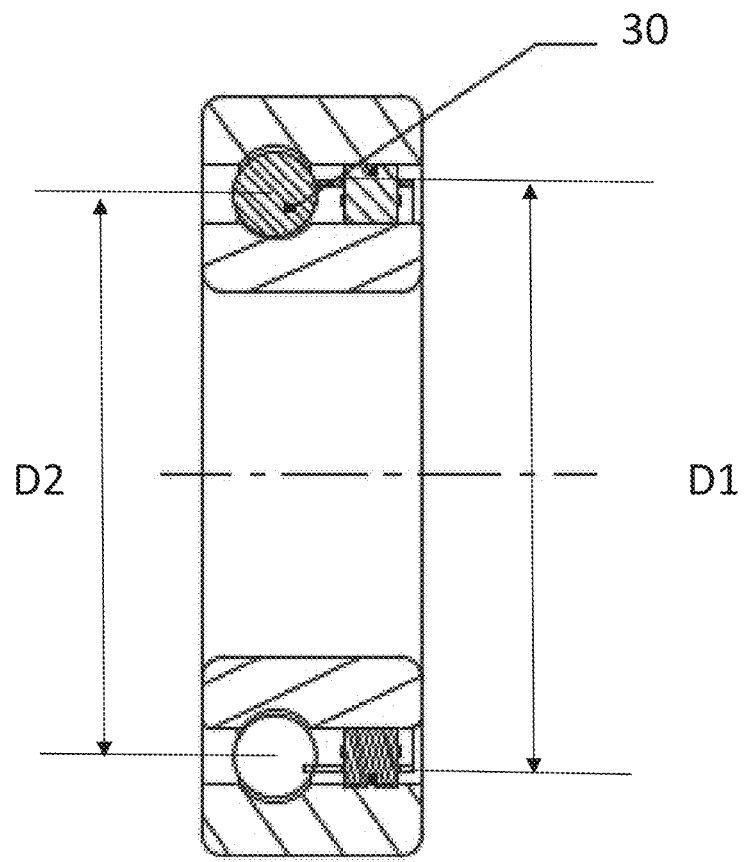
FIG. 12 is another cross-sectional view of the exemplary embodiment of the double-row one-way bearing, which shows that a diameter of the cage is larger than a diameter of the circle formed by the centres of the plurality of spherical rollers.
Figure 13:
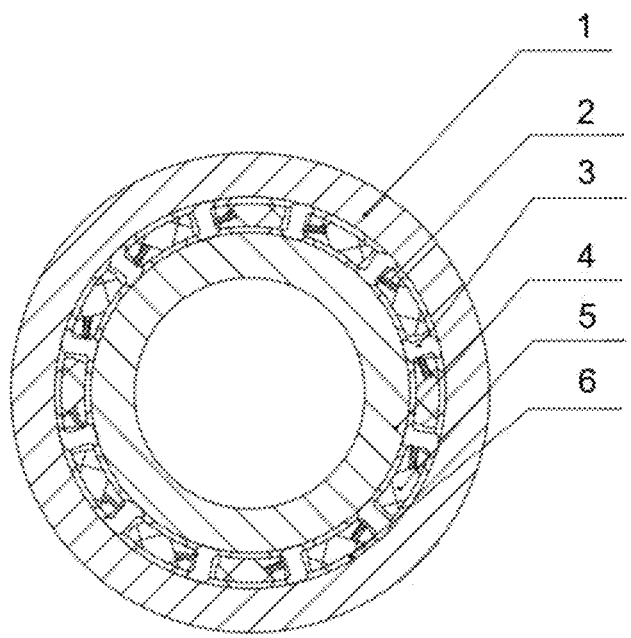
FIG. 13 is a schematic view of a one-way bearing and its constituent parts according to the prior art.
Figure 14:
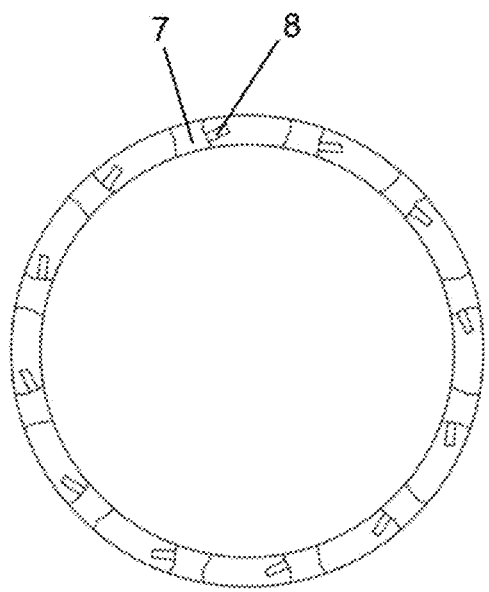
FIG. 14 is a schematic view of a cage of a prior art one-way bearing.
Figure 15:
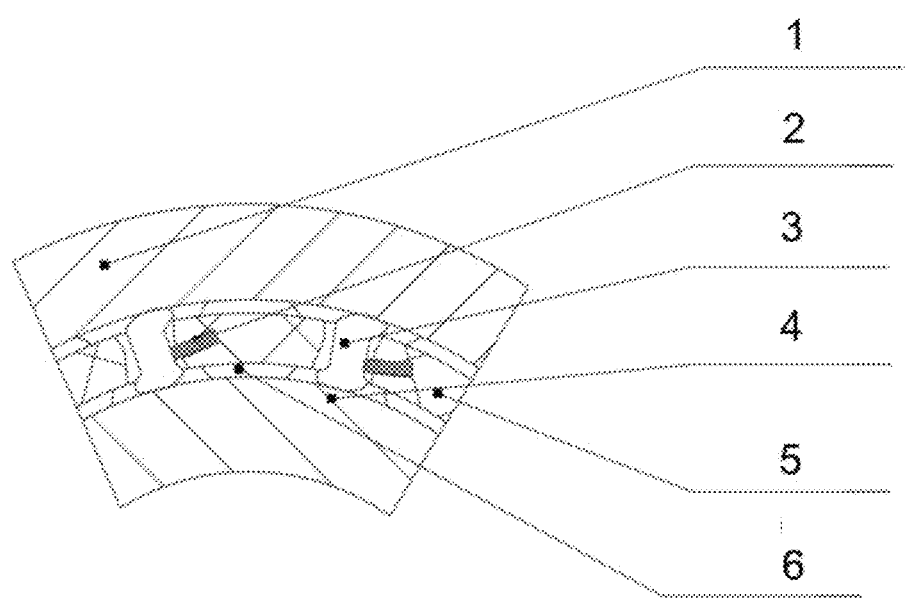
FIG. 15 is an enlarged schematic view of the prior art one-way bearing and its constituent parts.

Preferably, the assembled cage 50 is not located at the centre of each spherical rollers 30, but slightly higher than the centre position, that is, farther away from the central axis of the one-way double-row bearing than the centre position. In this way, the diameter D1 of the cage 50 is larger than the diameter D2 of a circle formed by the centres of the plurality of spherical rollers 30 are located, as shown in FIG. 12.

Preferably, compared with the prior art, the wedge holding portions 52 can be enclosed pockets, that is, it has no axially outward opening. The wedge holding portions 52 may be arranged to be evenly spaced apart from each other in the circumferential direction. Since the enclosed shape of the wedge holding portions 52 itself can limit the axial displacement of the wedges, there is no need to add additional axial limiting structures/parts, that is, the annular covers as in the prior art are not needed. Therefore, the bearing according to the present disclosure can be designed as an open bearing without sealing to receive lubricant from the outside of the bearing, and more types of sealing structures can also be selected.

Figure 8:
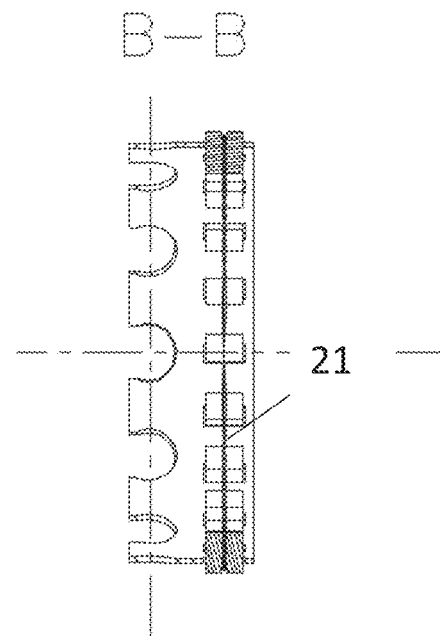
FIG. 8 is a schematic diagram of an exemplary embodiment showing the installation relationship of the cage, the elastic limit ring, and the wedges from another perspective.

Preferably, the enclosed pockets can have rectangular shape, as shown in FIGS. 4 and 8, which show that the wedge holding portions 52 is a plurality of rectangular through holes spaced apart from each other.

Figure 5:
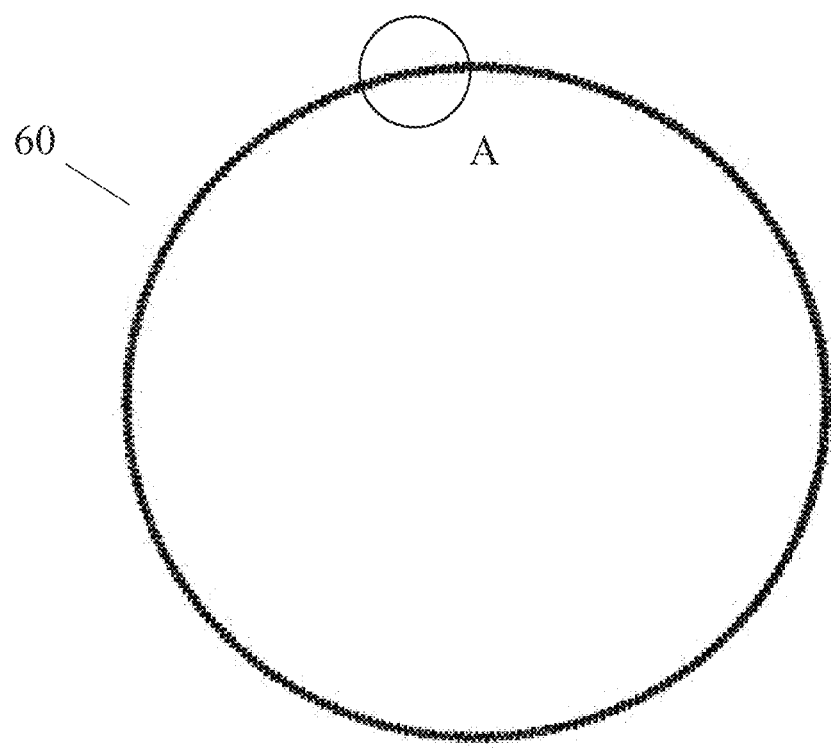
FIG. 5 is a schematic diagram of an exemplary embodiment of an elastic limit ring that can be used in the double-row one-way bearing of the present disclosure.
Figure 6:
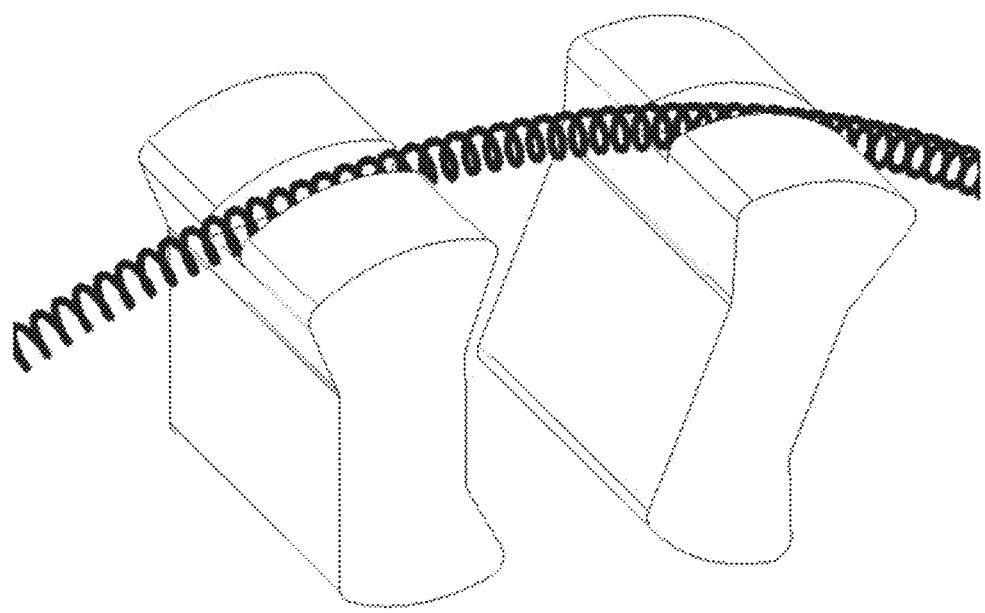
FIG. 6 is a partial enlarged view of the elastic limit ring of FIG. 5 and the elastic limit ring is assembled with the wedges.
Figure 7:
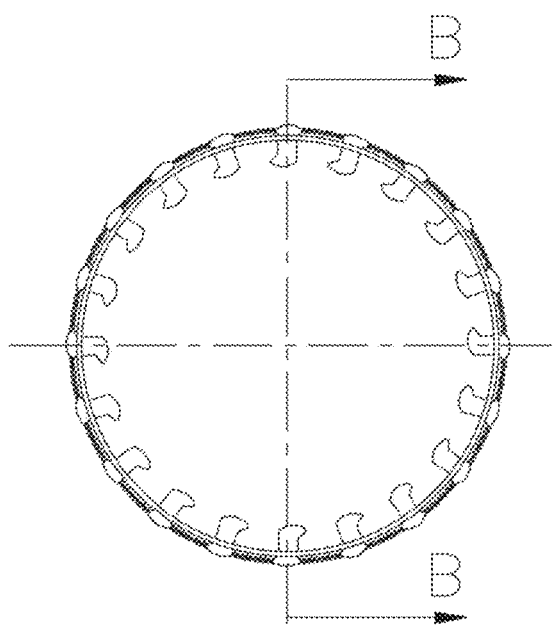
FIG. 7 is a schematic diagram showing an exemplary embodiment of the installation relationship of the cage, the elastic limit ring, and the wedges.

FIGS. 5 and 6 show an exemplary embodiment of the elastic limit ring 60. FIG. 6 is an enlarged view of a partial area A of the elastic limit ring of FIG. 5 and shows its state when assembled with the wedges. The elastic limit ring 60 is coaxially arranged with the bearing outer ring 10 and the bearing inner ring 20, and surrounds, engages and holds each of the plurality of wedges 40, to radially press and limit the wedges. FIGS. 7 and 8 respectively show the installation relationship of the cage, the elastic limit ring, and the wedges from different perspectives. As shown, each wedge is held by the cage on the one hand and limited by the common elastic limit ring at the same time.

The elastic limit ring 60 may have various suitable configurations and may be formed of various suitable materials. According to the preferred embodiment shown in FIG. 6, the elastic limit ring 60 is preferably formed by a wire (for example, a steel wire) which is spirally wound around an imaginary circle having the same centre with the elastic limit ring 60, to form the elastic limit ring 60. In other words, the elastic limit ring 60 may be a ring formed by bending a spiral wire.

Figure 11:
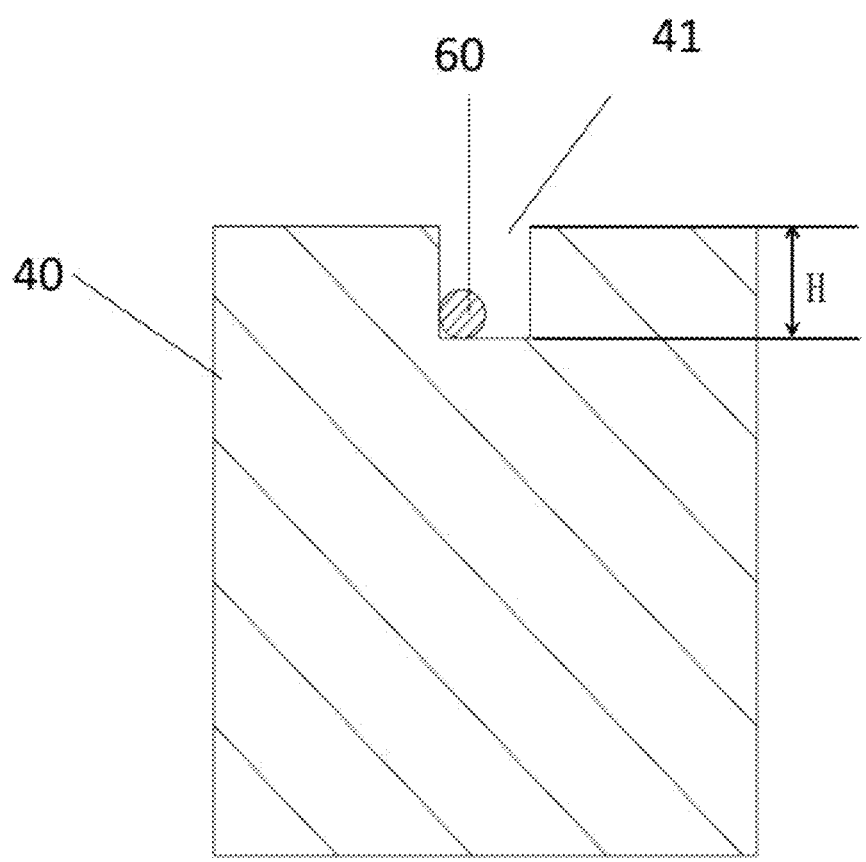
FIG. 11 is a cross-sectional view showing an exemplary embodiment of a mating relationship between the elastic limit ring and the wedges.

Preferably, the elastic limit ring 60 is installed to engage the bottom of the groove 41 of each wedge 40. FIG. 11 shows the matching relationship between the elastic limit ring and the wedges in a schematic way. It should be noted that the elastic limit ring 60 in this embodiment is formed by bending spiral wires, so in some cross-sectional positions, the wire of the elastic limit ring 60 contacts with the bottom of the grooves 41, as shown in FIG. 11, while in other cross-sectional positions not shown, the wires of the elastic limit ring 60 are separated from the bottom of the grooves 41. However, in general, the elastic limit ring 60 is installed in the groove 41 of each wedge 40 and firmly engages the bottom of each groove. In this state, the diameter of the elastic limit ring 60 is smaller than the depth H of the grooves 41. That is, after the elastic limit ring 60 is sleeved on each wedge, the elastic limit ring 60 will not protrude from the grooves 41 in the radial direction, or in other words, the depth of the grooves 41 are set so that the elastic limit ring 60 is "buried" in the grooves 41.

According to another preferred embodiments not shown, the elastic limit ring 60 can also be an elastic ring formed of elastic materials, such as an elastic rubber ring, for example, made of materials such as nitrile rubber (NBR), acrylate rubber (ACM) and fluororubber (FKM).

By providing the elastic limit ring 60 to hold a plurality of wedges, there is no need to install a plurality of springs for holding each wedge in the cage as in the prior art, which greatly simplifies the mechanism of the cage and further simplifies the installation of bearings.

Since the double-row one-way bearing according to the present disclosure is fundamentally different from the double-row one-way bearing in the prior art in both structure and principle, its assembly method is correspondingly different. Specifically, when assembling, the inner ring and the outer ring can be fixed first, and the spherical rollers are pressed into the raceway; subsequently, the wedges and the elastic limit ring are assembled on the cage; finally, the cage with the wedges and elastic limit ring installed thereon is installed in the bearing, so that each spherical roller is installed in the corresponding roller holding portion, and the assembly of the bearing is completed.

The exemplary implementation of the scheme proposed in this disclosure has been described in detail above with reference to the preferred embodiments. However, those skilled in the art can understand that various variations and modifications can be made to the above specific embodiments without departing from the concept of this disclosure, and various technical features and structures proposed in this disclosure can be combined in various ways without exceeding the protection scope of this disclosure, which is determined by the appended claims.

What is claimed is:

1. A double-row one-way bearing comprising:
   a bearing outer ring and a bearing inner ring coaxially arranged around the central axis of the double-row one-way bearing, wherein the bearing outer ring and the bearing inner ring have raceways and the bearing inner ring is located inside the bearing outer ring;
   a plurality of spherical rollers arranged between the bearing outer ring and the bearing inner ring along the raceway;
   a plurality of wedges radially arranged between the bearing outer ring and the bearing inner ring relative to the central axis and spaced apart from the plurality of spherical rollers in the axial direction, and each wedge is provided with a groove at the side away from the bearing inner ring, a number of the plurality of wedges is greater than a number of the plurality of spherical rollers;
   a cage arranged coaxially with the bearing outer ring and the bearing inner ring and provided with a plurality of roller holding portions and a plurality of wedge holding portions, wherein the plurality of spherical rollers is respectively held in the plurality of roller holding portions and the plurality of wedges are respectively held in the plurality of wedge holding portions;
   an elastic limit ring coaxially arranged with the bearing outer ring and the bearing inner ring and passes through the groove of each wedge to apply a radially inward force to each wedge.

2. The double-row one-way bearing according to claim 1, wherein a thickness of the cage in the radial direction is 5-30% of a diameter of the spherical roller.

3. The double-row one-way bearing according to claim 2, wherein the thickness of the cage in the radial direction is 5-15% of the diameter of the spherical roller.

4. The double-row one-way bearing according to claim 3, wherein the wedge holding portion is an enclosed pocket.

5. The double-row one-way bearing according to claim 4, wherein the cage is a pressed cage.

6. The double-row one-way bearing according to claim 5, wherein a thickness of the wedge in the circumferential direction is 2%-4.5% of a circumference of circle formed by the inner diameter of the cage.

7. The double-row one-way bearing according to claim 6, wherein the elastic limit ring is engaged with a bottom of groove of each wedge, and a diameter of the elastic limit ring is smaller than a depth of the groove.

8. The double-row one-way bearing according to claim 7, wherein the elastic limit ring is composed of a wire which is spirally wound around an imaginary circle having the same centre with the elastic limit ring.

9. The double-row one-way bearing according to claim 8, wherein the elastic limit ring is an elastic circular ring made of elastic materials.

10. The double-row one-way bearing according to claim 9, wherein a diameter of the cage is larger than a diameter of a circle formed by centres of the plurality of spherical rollers.

11. The double-row one-way bearing according to claim 1, wherein the wedge holding portion is an enclosed pocket.

12. The double-row one-way bearing according to claim 1, wherein the cage is a pressed cage.

13. The double-row one-way bearing according to claim 1, wherein a thickness of the wedge in the circumferential direction is 2%-4.5% of a circumference of circle formed by the inner diameter of the cage.

14. The double-row one-way bearing according to claim 1, wherein the elastic limit ring is engaged with a bottom of groove of each wedge, and a diameter of the elastic limit ring is smaller than a depth of the groove.

15. The double-row one-way bearing according to claim 1, wherein the elastic limit ring is composed of a wire which is spirally wound around an imaginary circle having the same centre with the elastic limit ring.

16. The double-row one-way bearing according to claim 1, wherein the elastic limit ring is an elastic circular ring made of elastic materials.

17. The double-row one-way bearing according to claim 1, wherein a diameter of the cage is larger than a diameter of a circle formed by centres of the plurality of spherical rollers.

18. The double-row one-way bearing according to claim 1, wherein each spherical roller of the plurality of spherical rollers has a center, and wherein an inner-most diameter of the cage is greater than a diameter of a circle passing through the centers of the plurality of spherical rollers.

19. The double-row one-way bearing according to claim 1, wherein the plurality of wedge holding portions are disposed radially outward of centers of the plurality of spherical rollers.

20. The double-row one-way bearing according to claim 1, wherein the elastic limit ring is disposed radially outward of the cage.

* * * * *